Patented Jan. 31, 1933

1,895,950

UNITED STATES PATENT OFFICE

HERMANN VOIGTLÄNDER AND OTTO KAUFELS, OF ESSEN, GERMANY, ASSIGNORS TO FRIED. KRUPP AKTIENGESELLSCHAFT, OF ESSEN-ON-THE-RUHR, GERMANY

SHAPED BODY HAVING A PREDOMINATING PERCENTAGE OF TUNGSTEN OR MOLYBDENUM AND PROCESS OF PRODUCING IT

No Drawing. Application filed April 4, 1929, Serial No. 352,602, and in Germany May 2, 1928.

Our invention relates to a new process for producing shaped bodies of carbides of tungsten or molybdenum. According to the invention the bodies are produced by preparing a fused alloy consisting of tungsten carbides or molybdenum carbides and of a metal or metalloid, or a carbide thereof, that has a lower melting point than the first-named carbides, and by giving the fused alloy the desired shape by applying pressure while the mass is at softening temperature.

Our new process may be carried out e. g. in the following manner: In a carbon or graphite resistance furnace is melted an alloy which contains at least 80 per cent of tungsten, at most 20 per cent of a lower melting metal or metalloid (e. g. nickel, cobalt, iron, or silicon), and carbon. This alloy is first brought to the approximate shape of the desired body by casting, and the desired finish shape is given to the mass so pre-shaped by applying pressure while it is at softening temperature (about at 2200 to 2400 degrees C.), which is lower than the melting temperature.

The described process affords the advantage that the finish shaped body very accurately acquires the prescribed shape, which advantage cannot be obtained by a pure casting process. Furthermore, the finish shaped body is distinguished by particularly high strength, density, and tenacity.

In place of the lower melting metals or metalloids, carbides thereof may be used. The percentage of carbon of this alloy further may be lower than 3 per cent without resulting in an undesired decrease of the hardness; this percentage advantageously will lie between 2 and 6.2 per cent. The softening temperature employed generally lies about 10 per cent below the melting temperature.

We claim:—

1. Process of producing shaped bodies of a predominating percentage of carbide of tungsten or molybdenum, consisting in preparing a fused alloy composed of 80% or more of at least one carbide of tungsten or molybdenum and not over 20% of a strengthening metal or metalloid having a lower melting point than said carbide, cooling said alloy, and giving said alloy the desired finish shape by applying pressure to it at a temperature of about 2200 to 2400° C.

2. Process of producing shaped bodies of a predominating percentage of carbide of tungsten or molybdenum, consisting in preparing a fused alloy composed of 80% or more of at least one carbide of tungsten or molybdenum and not over 20% of a metal of the iron group, cooling said alloy, and giving said alloy the desired finish shape by applying pressure to it at a temperature of about 2200 to 2400° C.

3. Process of producing shaped bodies of a predominating percentage of carbide of tungsten or molybdenum, consisting in preparing a fused alloy composed of 80% or more of at least one carbide of tungsten or molybdenum and not over 20% of silicon, cooling said alloy, and giving said alloy the desired finish shape by applying pressure to it at a temperature of about 2200 to 2400° C.

4. Process of producing shaped bodies of a predominating percentage of carbide of tungsten or molybdenum, consisting in preparing a fused alloy composed of 80% or more of at least one carbide of tungsten or molybdenum and not over 20% of a strengthening metal or metalloid having a lower melting point than said carbide, casting said alloy to give it approximately the desired finish shape, cooling said alloy, and giving said alloy the exact finish shape by applying pressure to it at a temperature of about 2200 to 2400° C.

5. A hard metal body composed of an alloy containing at least 80% of a carbide of tungsten or molybdenum and at most 20% of a strengthening metal or metalloid of lower melting point, said alloy having a shape and structure imparted to it by the application of pressure thereto with the alloy at a temperature of about 2200 to 2400° C.

6. A hard metal body composed of an alloy containing at least 80% of a carbide of tungsten or molybdenum and at most 20% of a metal of the iron group said alloy having a shape and structure imparted to it by the application of pressure thereto with the alloy at a temperature of about 2200 to 2400° C.

7. A hard metal body composed of an alloy containing at least 80% of a carbide of tungsten or molybdenum and at most 20% of silicon, said alloy having a shape and structure imparted to it by the application of pressure thereto with the alloy at a temperature of about 2200 to 2400° C.

The foregoing specification signed at Cologne, Germany, this 14th day of March, 1929.

HERMANN VOIGTLÄNDER.
OTTO KAUFELS.